(12) United States Patent
Okada (10) Patent No.: US 6,275,917 B1
(45) Date of Patent: Aug. 14, 2001

(54) HIGH-SPEED ADDRESS TRANSLATION SYSTEM

(75) Inventor: Takashi Okada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/232,048

(22) Filed: Jan. 15, 1999

(30) Foreign Application Priority Data

Aug. 12, 1998 (JP) .................................................. 10-227761

(51) Int. Cl.⁷ ....................................................... G06F 12/10
(52) U.S. Cl. .......................... 711/207; 711/170; 711/171; 711/172; 711/173; 711/202; 711/205; 711/206
(58) Field of Search ................... 711/202–209, 170–173, 711/165

(56) References Cited

U.S. PATENT DOCUMENTS

| | | | |
|---|---|---|---|
| 5,784,707 | * | 7/1998 | Khalidi et al. ........................ 711/206 |
| 5,802,341 | * | 9/1998 | Kline et al. ............................ 711/209 |
| 5,815,686 | * | 9/1998 | Earl et al. ............................. 395/500 |
| 5,956,756 | * | 9/1999 | Khalidi et al. ........................ 711/207 |

FOREIGN PATENT DOCUMENTS

| | | |
|---|---|---|
| 3-46043 | 2/1991 | (JP) . |
| 4-338848 | 11/1992 | (JP) . |
| 7-168761 | 7/1995 | (JP) . |
| 9-282233 | 10/1997 | (JP) . |

* cited by examiner

*Primary Examiner*—Than Nguyen
(74) *Attorney, Agent, or Firm*—Helfgott & Karas, P.C.

(57) ABSTRACT

In a high-speed address translation system provided in a computer system including a logical address space storing logical addresses, a physical address space for storing physical addresses and a microprocessor unit connected to both address spaces, and the microprocessor unit including a memory management unit (MMU), the system according to the present invention includes; a TLB provided in the MMU for translating the logical address to the physical address; and a unit for adjusting a size of each section formed of a file to a predetermined page size in an offline process in accordance with memory allocation designed in the offline process.

6 Claims, 9 Drawing Sheets

| SECTION | SIZE | MEMORY PROTECTION ATTRIBUTE | |
| --- | --- | --- | --- |
| | | USER MODE | PRIVILEGED MODE |
| USER CODE #1 | 3MB | R-E | R-E |
| USER RW DATA #1 | 12MB | RW- | RW- |
| USER R DATA #1 | 4MB | R-- | R-- |
| USER CODE #2 | 10MB | R-E | R-E |
| USER RW DATA #2 | 14MB | RW- | RW- |
| USER R DATA #2 | 6MB | R-- | R-- |
| PRIVILEGED CODE #1 | 4MB | --- | R-E |
| PRIVILEGED RW DATA #1 | 20MB | --- | RW- |
| PRIVILEGED R DATA #1 | 2MB | --- | R-- |
| PRIVILEGED CODE #2 | 11MB | --- | R-E |
| PRIVILEGED RW DATA #2 | 16MB | --- | RW- |
| PRIVILEGED R DATA #2 | 4MB | --- | R-- |

Fig.8

| SECTION | ADDED SIZE | DUMMY SIZE | SECTION SIZE |
| --- | --- | --- | --- |
| USER CODE | 13MB | 3MB | 16MB |
| USER RW DATA | 26MB | 6MB | 32MB |
| USER R DATA | 10MB | 6MB | 16MB |
| PRIVILEGED CODE | 15MB | 1MB | 16MB |
| PRIVILEGED RW DATA | 36MB | 12MB | 48MB |
| PRIVILEGED R DATA | 6MB | 10MB | 16MB |

HIGH-SPEED ADDRESS TRANSLATION SYSTEM

BACKGROUND OF THE INVENTION

1. Field of the Invention

The present invention relates to a high-speed address translation system. Particularly, it relates to memory allocation in a translation lookaside buffer (below, TLB) provided in a memory management unit (below, MMU) in a computer system. The high-speed address translation system according to the present invention can be advantageously utilized in the field of an electronic switching system formed of an online real-time system having high reliability.

2. Description of the Related Art

In general, a TLB is provided in order to dynamically access between a virtual address space (or, a logical address space) and a physical address space. In this case, a predetermined program is executed with reference to the virtual address space, and an actual content of the program is arranged in the physical address space. The TLB is formed by a plurality of entries and usually provided within a MMU, as hardware, in a normal computer system.

Figure 11:
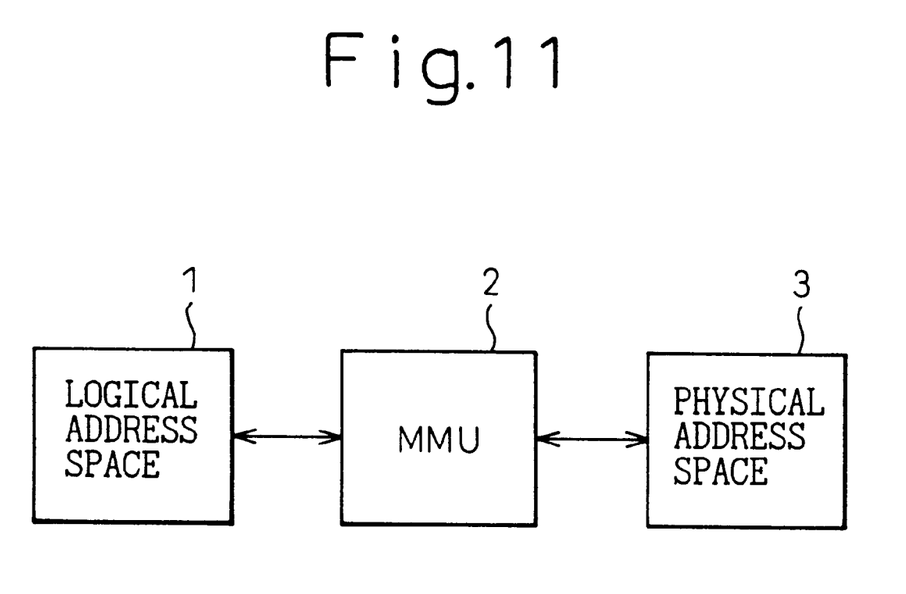
FIG. 11 is a basic block diagram of a conventional system.

For example, in general, a system utilizing an address translation system is formed by a logical address space, a MMU connected to the logical address space and a physical address space connected to the MMU for executing an actual program (see FIG. 11).

In this structure, the address space is managed based on a minimum unit of the memory management which is called a "page". Further, the TLB stores corresponding relationships between the virtual address and the physical address in accordance with the page, and translates the virtual address to the physical address in response to an instruction access or a data access.

Since the TLB is formed by the hardware as mentioned above, it has a finite space which can be utilized as a resource. Accordingly, contents of the TLB must be updated in accordance with frequency in use thereof. For example, when an address to be translated from the virtual address to the physical address is missed (i.e., not hit) in the TLB, that address information is provided from a main memory to the TLB.

On the other hand, in the normal computer system, a predetermined program is loaded on the memory in accordance with a request from an operator, and the memory is released after execution of the predetermined program. Accordingly, in a conventional art, the page size is fixed to one kind of size as the minimum unit to be managed in order to raise efficiency in use of the memory.

However, in an online real-time system, such as a switching system, a program, in which a time-critical process is required, is loaded on an address space which was previously allocated. Further, in the time-critical process, when the address is missed in the TLB (below, TLB miss-hit), the TLB miss-hit is processed dynamically either by using a predetermined hardware, or by using an operating system (OS) as a trap operation (i.e., an interrupt to the OS when the TLB miss-hit occurs). In this case, however, since the above process for the TLB miss-hit is not recognized by an application program (i.e., the TLB miss-hit is "invisible" to an operator), an unexpected fall in performance occurs in the system.

The present invention aims to solve the above mentioned problems in the conventional art. That is, in an online real-time system required for high reliability, such as a switching system, the present invention aims to provide a high-speed address translation system in which it is possible to eliminate an overhead due to the TLB miss-hit in very important process, such as a basic call process in the exchange (in other word, the TLB miss-hit can be recognized by the operator) when executing the address translation in the present invention. According to the present invention, it is possible to considerably improve performance of the system, and to raise precision of expected performance without consideration of the TLB miss-hit in the real-time process.

SUMMARY OF THE INVENTION

The object of the present invention is to provide a high-speed address translation system which can eliminate an overhead due to the TLB miss-hit in a very important process, such as a basic call process in a switching system, when executing the address translation.

In accordance with the present invention, there is provided a high-speed address translation system provided in a computer system including a logical address space storing logical addresses, a physical address space for storing physical addresses and a microprocessor unit connected to both address spaces, and the microprocessor unit including a memory management unit, the system including; a translation lookaside buffer (TLB) provided in the memory management unit for translating the logical address to the physical address; and a unit for adjusting a size of each section formed of a file to a predetermined page size in an offline process in accordance with memory allocation designed in the offline process.

In a preferred embodiment, sections each having the same memory protection attribute are allocated to a continuous address space.

In another preferred embodiment, sections each having the same memory protection attribute and allocated to the continuous address space are merged to one section.

In still another preferred embodiment, the predetermined page size is a large page size, and when a sum of the size of each section does not reach to the large page size and occurs in a size of fraction (below, fraction size), a dummy section is provided to this fraction size in the offline process, and the dummy section is merged with each section in order to form the large page size so that whether the page size is large is easily determined, at high speed, in an online program.

In still another preferred embodiment, an interface is provided to the memory management unit in order to allocate the memory which becomes the large page size, for a program which performs memory allocation in an online process.

In still another preferred embodiment, the memory management unit provides a lock instruction to the TLB so that a processor having a lock function to the TLB can be easily utilized for a part of program performing a time-critical process.

In still another preferred embodiment, in a TLB architecture separately formed by an instruction TLB and a data TLB and TLB lock being performed separately to the instruction TLB and the data TLB, or in the other TLB architecture formed by the instruction TLB mixed with the data TLB, the TLB lock control is performed based on the same process in these architectures.

In still another preferred embodiment, the TLB is formed of the logical address, the physical address, data size, memory protection attribute, and cache attribute.

In still another preferred embodiment, the memory protection attribute is formed by a user mode and a privileged mode, and both modes includes read operation, write operation and execution.

In still another preferred embodiment, the offline process is executed by an offline program module which is formed of at least two user programs each including user code and user data, and at least two privileged programs each including privileged code and privileged data.

In still another preferred embodiment, the online process is executed by an online program module which is formed of sections including user code, user data, privileged code and privileged data.

In still another preferred embodiment, the offline program module is translated into the online program module, in the above translation, both user codes in the offline program module are merged to one user code in the online program module, both user data are merged to one user data, both privileged codes are merged to one privileged code, and both privileged data are merged to one privileged data.

In still another preferred embodiment, the online program module is formed of the user code section and the user data section, the user code section is formed of two user codes and the dummy section, and the user data section is formed of two user data and the dummy section.

In still another preferred embodiment, in the online program module, a size of the dummy section is determined so as to become a predetermined multiple of large page size.

In still another preferred embodiment, the online program module includes a header portion which contains section information formed of head address, size, memory protection attribute, cache attribute, TLB lock instruction and section actual location.

DESCRIPTION OF THE PREFERRED EMBODIMENTS

Figure 1:
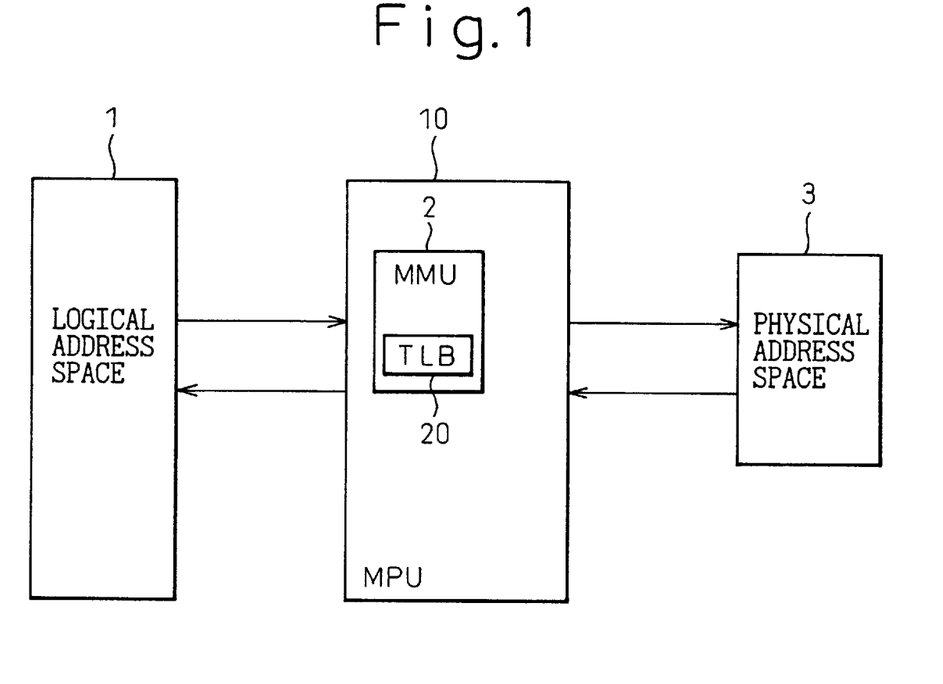
FIG. 1 is a basic structure of a system utilizing a high-speed address translation system according to the present invention.

FIG. 1 is a basic structure of a system utilizing a high-speed address translation system according to the present invention. In FIG. 1, reference number 1 denotes a logical address space (i.e., a virtual address space), and reference number 3 denotes a physical address space in which a predetermined program is executed. Further, reference number 10 denotes an MPU (Micro Processing Unit) connected to the logical address space 1 and the physical address space 3. The MPU includes an MMU (Memory Management Unit) 2 which has a TLB (Translation Lookaside Buffer) 20 for translating the logical address to the physical address.

According to the above structure of the present invention, it is possible to reduce miss-hit in the TLB (i.e., TLB miss-hit) by adjusting a size of each section of a file to a predetermined page size in an offline process which is executed by an offline program module on a computer used in development of the system.

As another feature, in the present invention, sections each having the same memory protection attribute are allocated to a continuous address space. According to this structure, it is possible to easily realize memory management by collecting sections having the same memory protection attribute.

As still another feature, sections having the same memory protection attribute and continuous address space are merged in order to obtain a single section. According to this structure, sections allocated to continuous address space are merged so that it is possible to easily realize memory management.

As still another feature, a dummy section is prepared to a fraction portion of each section on the offline process so that determination of large page size can be performed at high speed by the online program which is executed by the online program module on a computer actually used in the switching system. According to this structure, it is possible to easily execute processes at large page size by previously filling the space of large page in the offline process.

As still another feature, an interface (this term has the same meaning as a system call or a function call) is provided in order to determine a memory which is set to the large page size, for a program which executes memory allocation in the online process. According to this structure, it is possible to easily perform the address translation by using the large page.

As still another feature, the MMU provides a TLB lock instruction to a part of program which executes a time-critical process, so that a processor having a function to lock the TLB can utilize the TLB lock. According to this structure, it is possible to surely perform the time-critical process for a very important program.

As still another feature, in a TLB architecture separately formed by an instruction TLB and a data TLB and TLB lock being performed separately to the instruction TLB and the data TLB, and in the other TLB architecture formed by the instruction TLB mixed with the data TLB, the TLB lock control is performed based on the same process in these architectures. According to this structure, it is possible to perform in parallel the address translation process by separating the instruction TLB and the data TLB.

Next, various embodiments of the present invention are explained in detail with reference to the attached drawings.

The following two requirements are essentially required in an online real-time system having high reliability, such as a switching system.

(1) The time-critical process, such as basic call process, is performed at high speed, and an amount of process and process time can be expected.

(2) The protection of write data to the memory space can be appropriately performed, and an important data, such as charging data, can be prevented from unexpected destruction.

The following are further required in order to satisfy the above requirements.

(a) There is either no miss-hit, or very little miss-hit in the TLB, when performing the time-critical process.

(b) It is possible to perform memory protection in accordance with kinds of sections, for example, code section, data section, etc., in each program.

Still further, an online real-time system, such as a switching system, has the following characteristics.

a) A load module (program) is prepared in the form of an absolute format, and a design of memory and memory allocation are performed based on the offline process (i.e., performed by a computer used for development of a system).

b) In the time-critical process, when a program for the time-critical process is initially set up, a resource which is required for execution of the program, such as a memory, is previously allocated.

Still further, the MMU may provide a plurality of page sizes as the hardware. In this case, a page size (for example, 10 MB), which is larger than the minimum page size (for example, 4 KB), is called "large page" below. Since the TLB miss-hit occurs at the time when failing to translate the virtual address to the physical address in each page, it is possible to reduce a miss-hit rate in the TLB if the page size is large, i.e., if the large page size is used.

Still further, the MMU may provide means for locking entries in the TLB in order to completely eliminate the miss-hit in the TLB.

By utilizing the above characteristics, the miss-hit in the TLB can be suppressed in use of the following high-speed address translation system, and it is possible to realize a complete hit rate (100% hit) in the TLB in the time-critical process.

Figure 2:
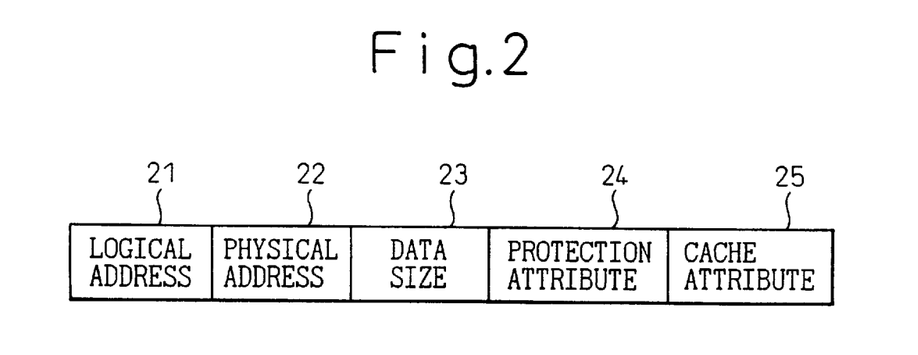
FIG. 2 is a structural view of the TLB according to one example of the present invention.

FIG. 2 is a structural view of the TLB according to one example of the present invention. As shown in FIG. 2, the TLB is formed by a logical address portion 21, a physical address portion 22, a data size portion 23, a protection attribute portion 24, and a cache attribute portion 25.

As explained in detail below, the protection attribute is used for determining which state is possible (or impossible) in the following three states, i.e., write operation, read operation and execution. Further, the cache attribute is used for determining either "cachable" state or "non-cachable" state of the system.

(A) In accordance with a prosecution which designs the memory allocation in the off-line process, a size of each section (a code section and data section) of each file is adjusted to the large page size in the offline process, as explained below.

(A-1) Sections each having the same memory protection attribute are merged and allocated to continuous space. For example, there are the following three sections; i.e., a code section (usually, it is possible to perform "read operation" and "execution" but it is impossible to perform "write operation"); a data section (usually, it is possible to perform "read operation" and "write operation" but it is impossible to perform "execution"); and a read only data section (usually, it is possible to perform only "read operation" but it is impossible to perform "write operation" and "execution").

Figure 3A:
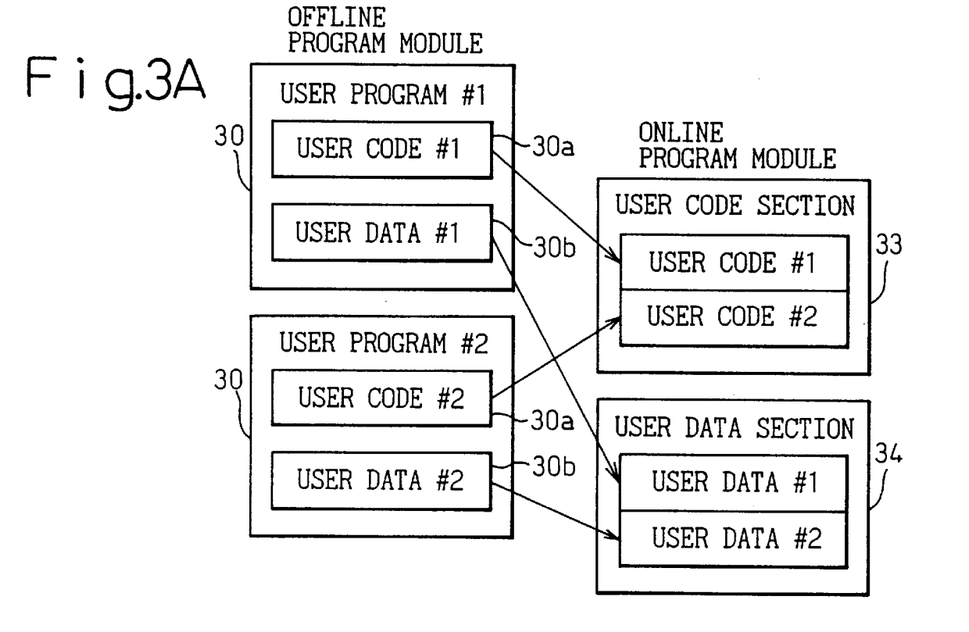
FIGS. 3A and 3B are explanatory views for explaining memory allocation according to the present invention.
Figure 3B:
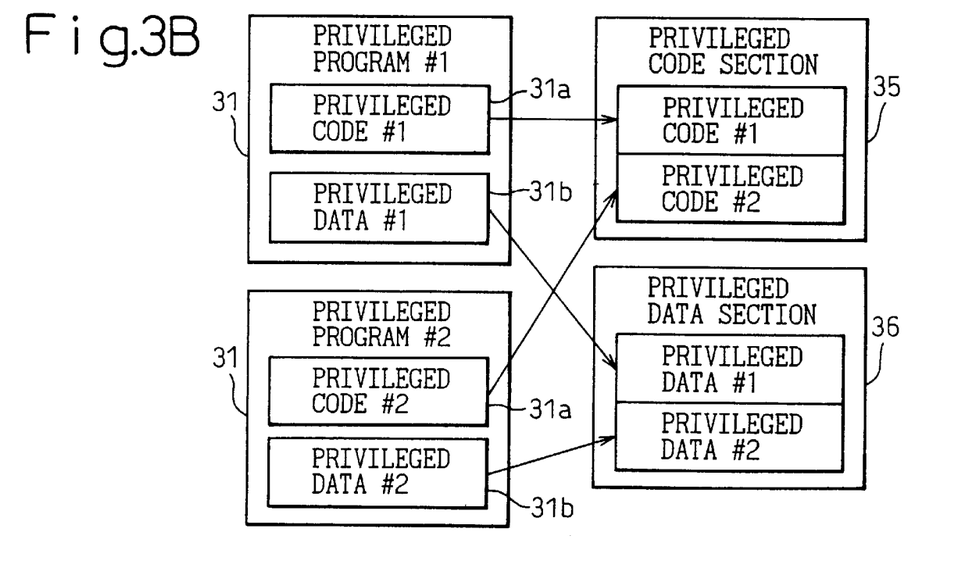

FIGS. 3A and 3B are explanatory views for explaining memory allocation according to the present invention. In this case, an "offline program module" is a program module used in the development of a computer, and an "online program module" is a program module used in a computer (i.e., a target machine) for a switching system. In the offline program module, reference number 30 denotes a user program, and number 31 denotes a privileged program which is more preferentially performed than the user program. A plurality of user programs and privileged programs are provided in this embodiment.

In the user program 30, numeral 30a denotes a user code #1, and numeral 30b denotes a user data #1. In the privileged program 31, numeral 31a denotes a privileged code 31, and numeral 31b denotes a privileged data #1. For the user codes #1 and #2 (30a), it is possible to perform read operation and execution, but it is impossible to perform write operation, in both user/privileged modes. On the other hand, for the user data #1 and #2 (30b), it is possible to perform read and write operations, and it is impossible to perform execution, in both user/privileged modes.

As shown by arrow lines, the modules having the same memory protection attribute contained in each program of the offline program module, are collected to one section having the same memory protection attribute, when allocating each module to the online program module. For example, the user code #1 (30a) in the user program section #1 and the user code #2 (30a) in the user program section #2 are collected into the user code section 33 in the online program module. Further, the user data #1 (30b) in the user program section #1 and the user data #2 (30b) in the user program section #2 are collected into the user data section 34 in the online program module.

Similarly, the privileged code #1 (31a) in the privileged program section #1 and the privileged code #2 (31a) in the privileged program section #2 are collected into the privileged code section 35. Further, the privileged data #1 (31b) in the privileged program section #1 and the privileged data #2 (31b) in the privileged program section #2 are collected into the privileged data section 36.

As explained in detail in FIG. 7 below, in the privileged code section 31a, it is possible to perform the read operation and the execution only in the privileged mode, but it is impossible to perform the write operation in the privileged mode. Further, in the privileged data section 31b, it is possible to perform the read/write operations only in the privileged mode, but it is impossible to perform the execution in the privileged mode.

According to this embodiment, it is possible to realize easy management of the memory by collecting sections each having the same memory protection attribute.

Further, it is possible to obtain one section by merging the sections each having the same memory protection attribute and allocated to continuous address space. As a result, it is possible to realize easy management of the memory by merging sections each allocated to continuous address space.

(A-2) In order to determine whether it is the large page size or not at high speed in the online program, a dummy section is provided to a fraction portion at a head portion or at the end portion of the section in the offline process, and is merged with the user code or the user data sections. That is, it is possible to adjust the section size so as to become multiple of the large page by preparing and merging a dummy section for the fraction at the head portion or at the end portion of the section as explained in detail in FIG. 4 below.

Figure 4:
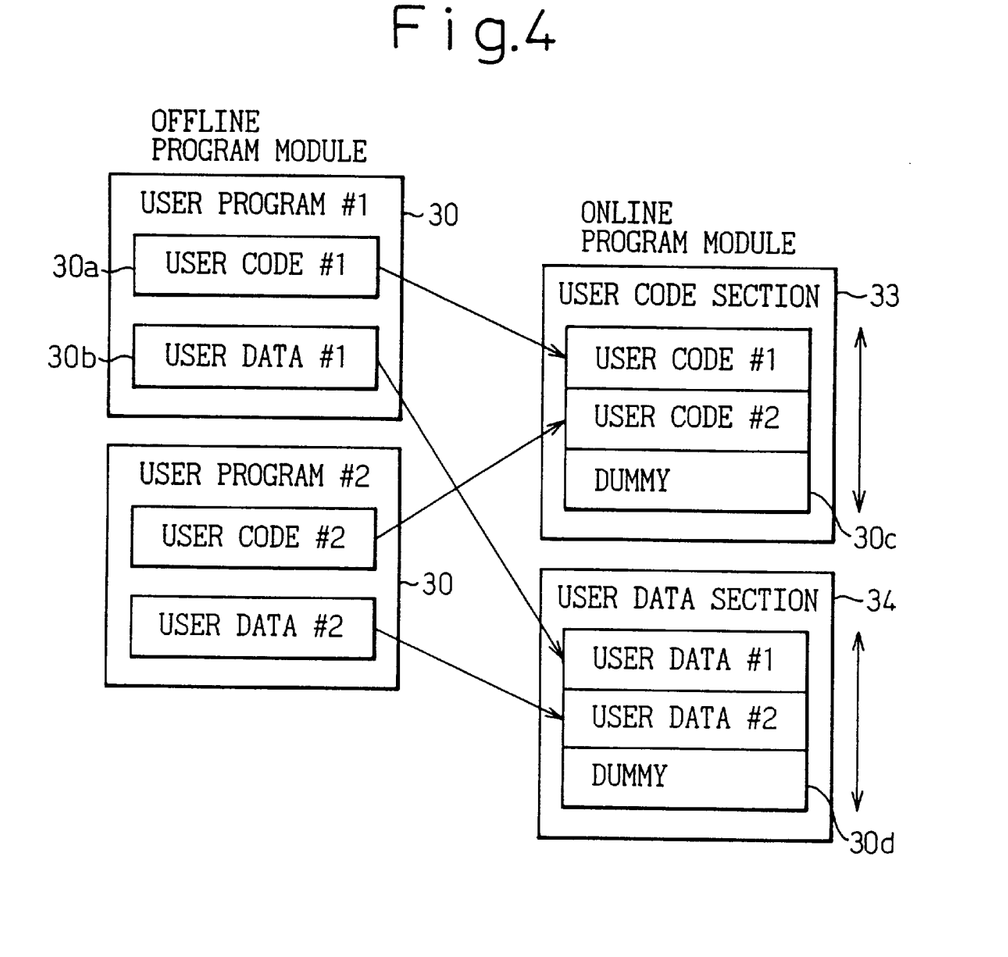
FIG. 4 is an explanatory view for explaining dummy sections according to the present invention.

FIG. 4 is an explanatory view for explaining dummy sections according to the present invention. In this case, the page size to be executed in the address translation is fixed, and the size of the large page is fixed to 16 MB. For example, in the user code section 33 in the online program module, when the user code #1 and the user code #2 of the offline program module are merged, and when the resultant size does not reach the multiple of the page size or the large page, the dummy section 30c is provided so as to obtain the multiple of the large page as explained in detail in FIG. 8.

Figure 8:
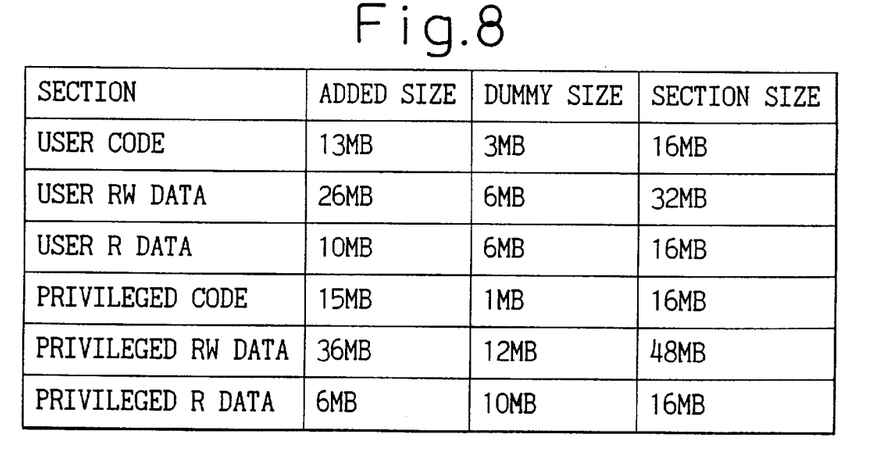
FIG. 8 is an explanatory view for explaining each section information after adjustment of the large page size according to the present invention.

Similarly, in the user data section 34 in the online program module, when the user data #1 and the user data #2 of the offline program module are merged, and when the resultant size does not reach the multiple of the page size or the large page size, the dummy section 30d is provided so as to obtain the multiple of the large page as explained in detail in FIG. 8.

According to this embodiment, it is possible to realize an easy process for the large page size by previously setting the page size so as to satisfy capacity of the large page size in the offline process.

(B) For a predetermined program which performs memory allocation in the online process, as one of interfaces (i.e., system call or function call) for memory allocation in the operating system, it is possible to provide an interface for a memory in which the head address is provided on the boundary of the large page size and the memory size is given by the multiple of the large page size.

Figure 5:
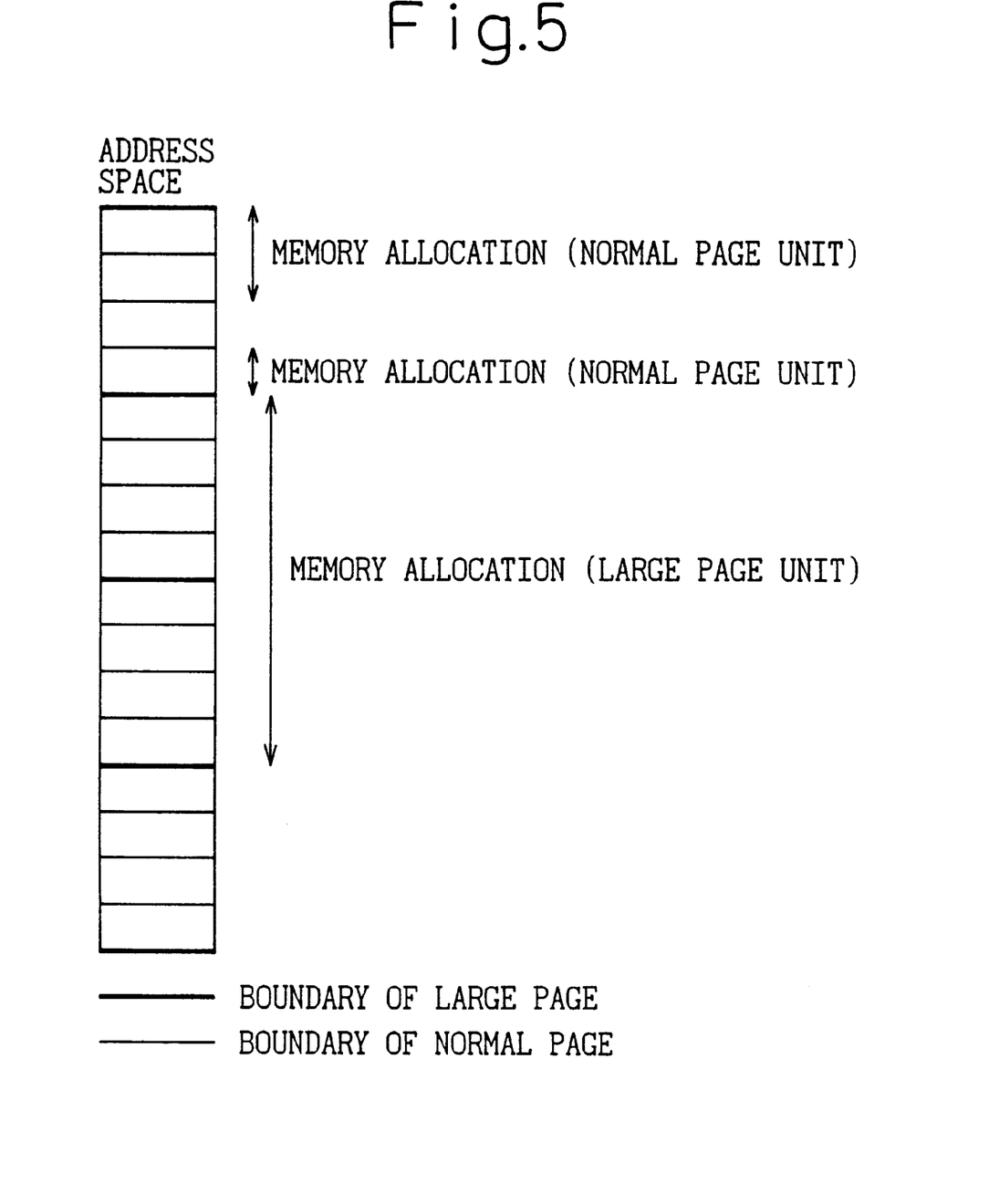
FIG. 5 is an explanatory view for explaining memory allocation for each unit of large page size according to the present invention.

FIG. 5 is an explanatory view for explaining memory allocation for each unit of the large page size according to the present invention. In the drawing, thin solid lines denote boundaries of memories for each unit of the normal page size, and thick solid lines denote boundaries of memories for each unit of the large page size. The operating system (OS) manages the empty or the full state of the address space at the normal page unit. Further, the OS determines whether the address space of the multiple of the large page size can be obtained from the boundary of the large page size when allocating the multiple of the large page size, and allocates the address space when the large page size is possible.

According to this embodiment, it is possible to easily perform the address translation using the large page.

(C) Lock control of the TLB entry (C-1) Particularly, in a processor having a function to lock particular information for address translation into the entry of the TLB, for a part of the program executing the time critical process (for example, a basic call in the exchange), the TLB lock instruction is applied to the code section or data section, i.e., to the section unit, so as to be able to utilize the TLB lock on the online system. This instruction is set to a header information section of a program file used on the online system as explained in detail below.

Figure 6:
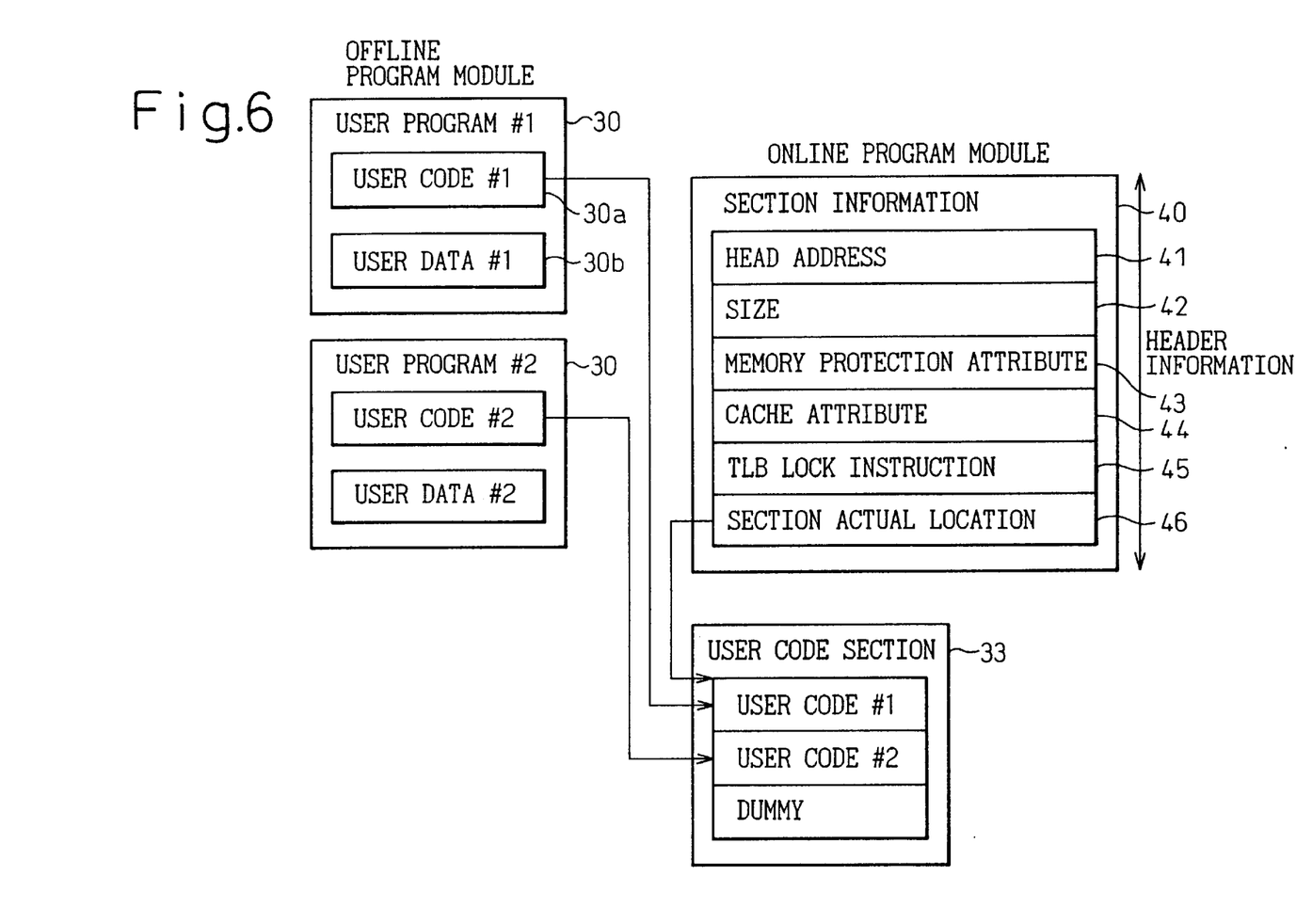
FIG. 6 is an explanatory view for explaining the TLB entry lock instruction according to the present invention.

FIG. 6 is an explanatory view for explaining the TLB entry lock instruction according to the present invention. As shown in FIG. 4, the sections each having the same memory protection attribute are collected as shown by the user code section 33 and user data section 34. For example, the header information section 40 including section information is provided to a head of the user code section 33.

The header information section 40 includes a head address 41, a data size 42, a memory protection attribute 43, a cache attribute 44, a TLB lock instruction 45, and a section actual location information 46. The section actual location 46 is connected to the user code section 33. In this case, the TLB lock instruction 45 is referenced when the lock control is performed to the TLB entry. In this case, the MMU controls in such a way that when this instruction is turned on, the TLB lock is always performed. According to this embodiment, it is possible to surely perform the time-critical process for an important program.

(C-2) As mentioned above, there is a processor having a separated TLB architecture in which a TLB used for instruction (i.e., instruction TLB) is provided separately from a TLB used for data (i.e., data TLB). On the other hand, there is another processor having a mixed TLB architecture in which the instruction TLB is provided mixedly with the data TLB. Further, if all entries in the TLB are designated as the entry to be locked, the system cannot operate when pages which cannot be entered exist.

In order to solve the above problem, an upper limit is provided to the number of entries in the TLB. In both processors, the maximum number of locks for the instruction TLB and the maximum number of locks for the data TLB are provided. In this case, both numbers of locks are used in the processor having the separated TLB architecture. On the other hand, a sum of both numbers of locks are used in the mixed TLB architecture as the maximum number of locks. As a result, it is possible to set the same conditions to the user in the separated TLB architecture or the mixed TLB architecture.

According to this embodiment, since it is possible to perform, in parallel, the address translation by separating the TLB into the instruction TLB and the data TLB, it is possible to improve throughput of the system.

Next, the concrete embodiment of the present invention will be explained in detail below. In the following explanation, it is assumed that there is a processor having the following performances, i.e., the minimum page size being 4 KB, the large page size being 16 MB, the TLB locking means being provided, the TLB having a mixed TLB architecture, and the number of entries being 64.

Figure 7:
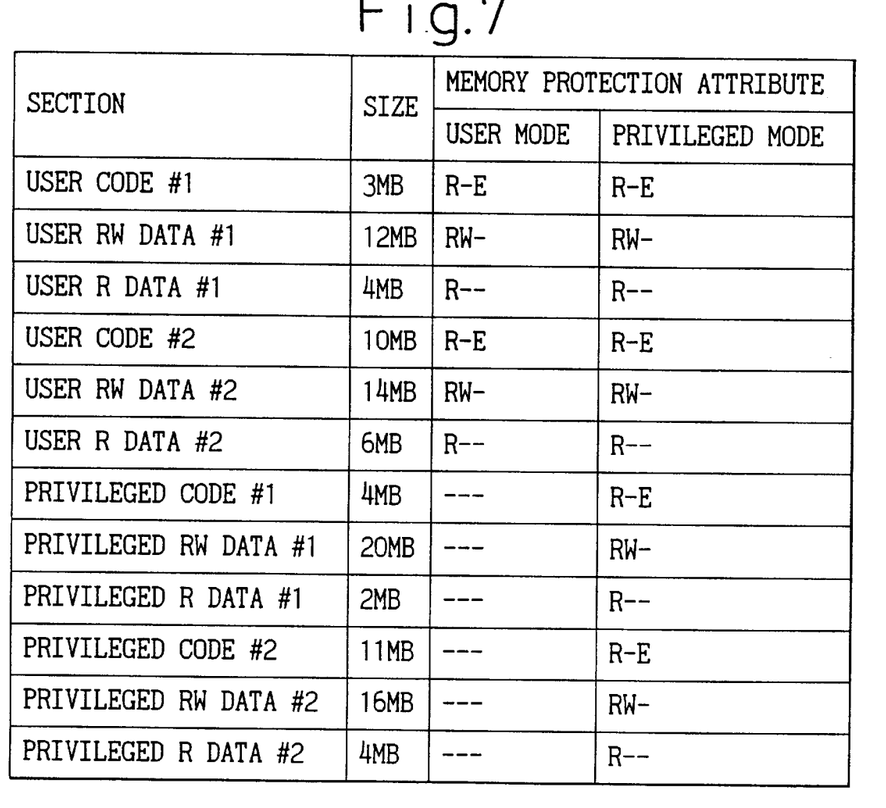
FIG. 7 is an explanatory view for explaining information for each section according to the invention.

(1) A method for adjusting to the large page size FIG. 7 is an explanatory view for explaining information for each section forming the program, and shows two user programs, two privileged programs, a kind of section in each program, and a size of memory in each program. In the drawing, "R" represents the read operation, "W" represents the write operation, "E" represents the execution, and the mark "-" represents "impossible" (i.e., "read" "write" and "execution" are impossible).

For example, in the user code #1, when the memory size is 3 MB, and when the memory protection attribute is the user mode, it is possible to perform the read operation and the execution, but it is impossible to perform the write operation (see "R-E" in the user mode). This is the same in the privileged mode in the memory protection attribute (see "R-E" in the privileged mode).

Further, as another example, in the user RW data #1, when the memory size is 12 MB, and when the memory protection attribute is the user mode, it is possible to perform the read operation and the write operation, but it is impossible to perform the execution (see "R W-" in the user mode). This is the same in the privileged mode in the memory protection attribute (see "R W-" in the privileged mode).

In this case, sections each having the same memory protection attribute are simply added. For example, the sections (user code #1 and user code #2) having the same "R-E" in the user mode, are simply added. That is, the memory size 3 MB of the user code #1 and the memory size 10 MB of the user code #2 are simply added, and 13 MB can be obtained. In this case, since the large page size is 16 MB, it is 3 MB empty. Accordingly, the dummy size becomes 3 MB, and the final section size of the use code becomes 16 MB as shown in FIG. 8.

FIG. 8 is an explanatory view for explaining each section information after adjustment of the large page size according to the present invention. For example, the size of the user RW data #1 is 12 MB, and the size of the user RW data #2 is 14 MB, Accordingly, the added size becomes 26 MB and the dummy size becomes 6 MB so that it is possible to obtain the section size of 32 MB (i.e., 16×2 MB). Further, as another example, the size of the privileged RW data #1 is 20 MB, and the size of the privileged RW data #2 is 16 MB. Accordingly, the added size becomes 36 MB and the dummy size becomes 12 MB so that it is possible to obtain the section size of 48 MB (i.e., 16×3 MB).

Figure 9:
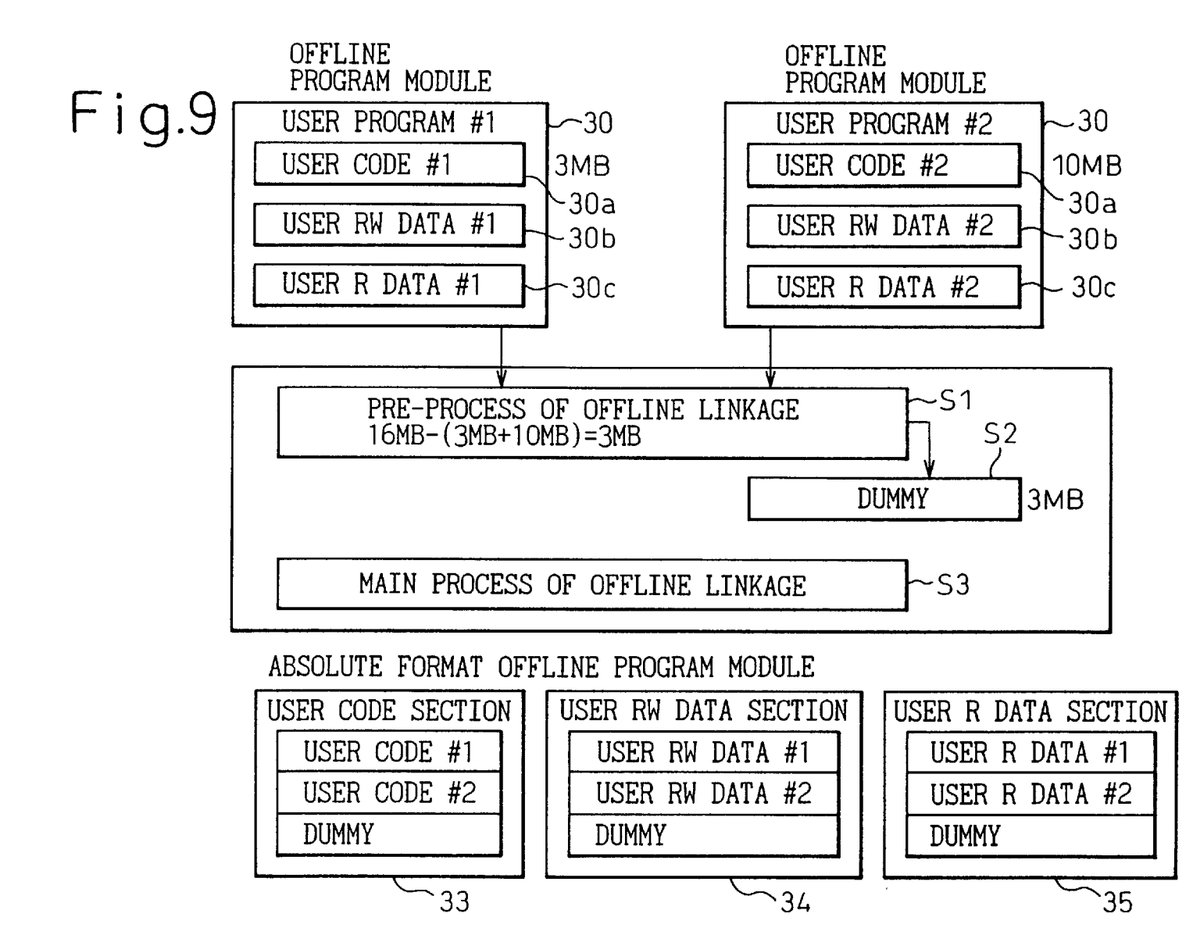
FIG. 9 is an explanatory view of steps for adjusting the section size to the large page size according to the present invention.

FIG. 9 is an explanatory view of steps for adjusting the section size to the large page size according to the present invention. This is in the case of merging the user program #1 and the use program #2 in the offline module. The user program #1 (30) having the section size 3 MB is formed by the user code #1 (30a), the user RW data #1 (30b) and the user R data #1 (30c). On the other hand, the user program #2 (30) having the section size 10 MB is formed by the user code #2 (30a), the user RW data #2 (30b) and the user R data #2 (30c).

Next, the MMU performs a pre-process of offline linkage, i.e., calculation of (16 MB−(3 MB+10 MB)=3 MB (dummy capacity)), in step S1, and obtains capacity of the dummy area, i.e., 3 MB, in step S2. Next, the MMU performs a main process for offline linkage in step S3. That is, the memory is designed based on the size including the dummy section, and the program module having an absolute format is prepared in step S3.

Further, the absolute format offline module includes the user code section 33, the user RW data section 34 and the user R data section 35. The user code section 33 includes the user code #1, the user code #2 and the dummy section. The user RW data section 34 includes the user RW data #1, the user RW data #2 and the dummy section. The user R data section 35 includes the user R data #1, the user R data #2 and the dummy section.

(2) Provision of an interface for memory allocation for the large page size

In the normal memory allocation interface on the processor, it is possible to ensure the memory having multiple of 4 KB from the address at the 4 KB boundary. On the other hand, the memory allocation interface for the large page size is provided in order to previously acquire the memory of the large page size at an initial setting time. The operating system, in addition to the normal management for a unit of 4 KB, determines whether the memory having the multiple of 16 MB can be allocated from the address at 16 MB boundary. When it is possible to ensure the memory having the multiple of 16 MB, the head address thereof is returned to the user. On the other hand, when it is impossible, i.e., when the memory capacity is under the setting value, the memory area is handled as the TLB entry to be locked.

According to this embodiment, it is possible to easily perform the large page process by previously filling the capacity of the large page in the offline process. Further, it is possible to easily perform the address translation using the large page.

(3) A method for controlling the lock of the TLB entry (3-1) A lock instruction for the TLB entry In FIG. 8, it is assumed that the privileged code section is very important in the real-time process. In the online real time system, in general, a computer used for developing a program (below, a computer for development) is different from a computer (i.e., so-called "machine") used for running the program prepared by the computer for development. Accordingly, the offline program module prepared by the computer for development is translated to the online program module.

In this case, when preparing the offline program module, the memory protection attribute and cache attribute are designated as shown in FIG. 6. Further, the TLB lock instruction is performed. The cache attribute is provided for selecting whether the data is provided or not provided on the cache memory. When the data is not provided on the cache memory, the data is directly accessed to a main memory.

Figure 10:
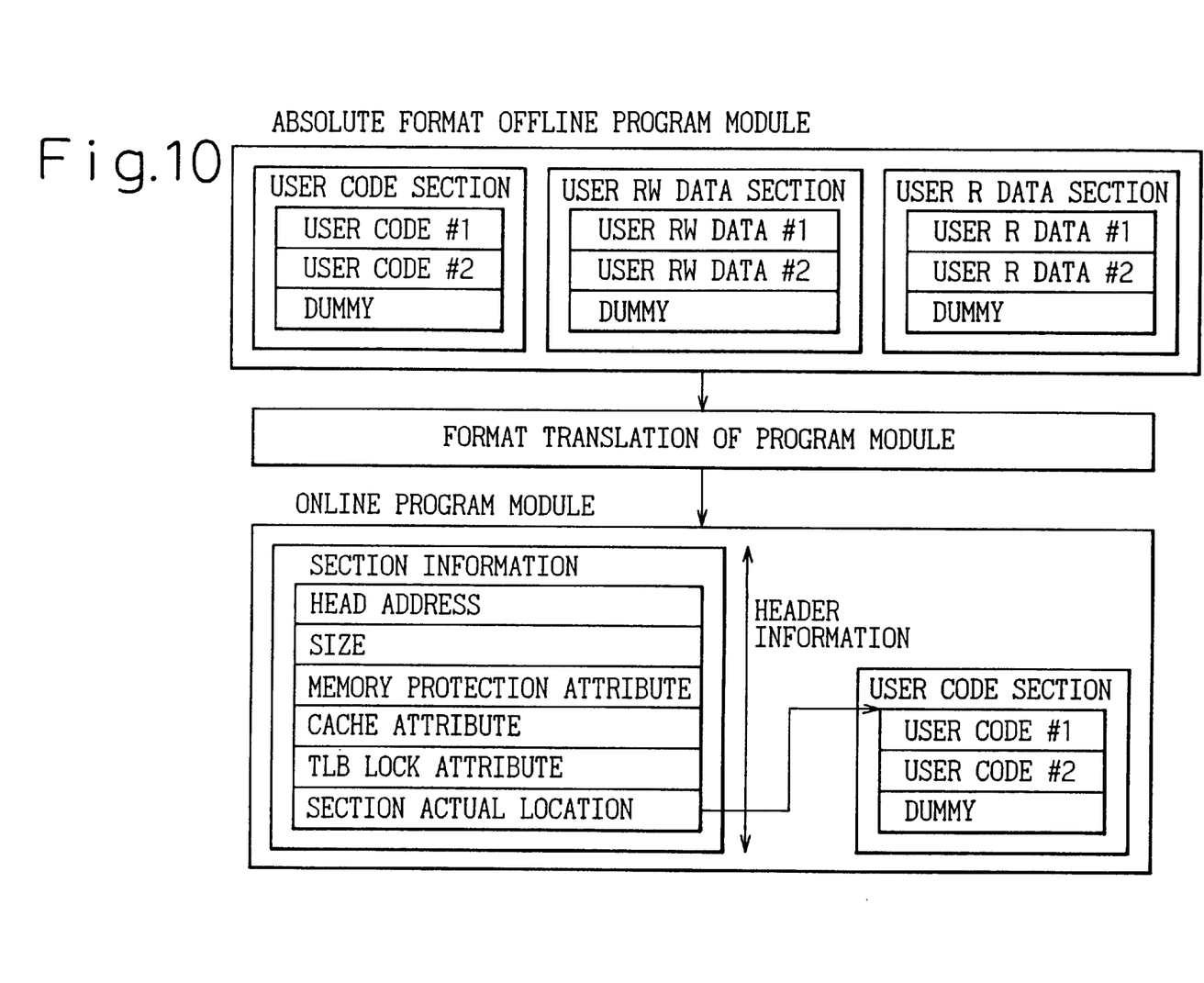
FIG. 10 is an explanatory view for explaining the TLB entry lock according to the present invention.

FIG. 10 is an explanatory view for explaining the TLB entry lock according to the present invention. The absolute format offline program module includes the user code section, the user RW data section and the user R data section, and each section includes the dummy section. These offline modules are translated to the online module. That is, the program module format on the computer for development is translated to the module format on the online system computer. In this process, the MMU determines the memory protection attribute and the cache attribute, and instructs the TLB lock for each section.

The module, which was translated to the module on the online system computer, is provided to the online program module. In this case, the online program module is the same module as shown in FIG. 6, and the TLB lock instruction is written into the header information.

(3-2) Maximum number of lock for TLB entry

The processor used in the present invention includes the mixed type TLB architecture. As the data which can be set by a system designer, the maximum number of locks for the instruction TLB and the maximum number of locks for the data TLB are provided. The total number of entries is 64 in the computer used in the present invention. For example, it is assumed that about half of entries can be locked and a rate of instruction and data is one-to-two. Further, it is assumed that the number of locks for the instruction TLB is 10 and the number of locks for the data TLB is 20. The operating system in the present invention controls the number of locks for TLB entry, i.e., 30 entries, as the maximum number of locks for TLB entries.

What is claimed is:

1. A high-speed address translation system provided in a computer system including a logical address space storing logical addresses, a physical address space for storing physical addresses and a microprocessor unit connected to both address spaces, and the microprocessor unit including a memory management unit, the system comprising:

a translation lookaside buffer (TLB) provided in the memory management unit for translating the logical address to the physical address; and means for adjusting a size of sections formed of a file to a predetermined page size in an offline process in accordance with memory allocation designed in the offline process, wherein the predetermined page size is a large page size and, when a sum of the size of each section does not reach to the large page size and a fractional page size occurs, a dummy section is provided to the size of the fraction in the offline process, and the dummy section is merged with each section forming the large page size so that whether or not the page size is large is easily determined at high speed in an online program, and wherein an interface is provided to the memory management unit in order to allocate the memory which becomes the large page size, for a program which performs memory allocation in an online process, and wherein, the online process is executed by an online program module which is formed of sections including user code, user data, privileged code and privileged data, and wherein an offline program module is translated into the online program module, in the above translation, both user codes in the offline program module are merged to one user code in the online program module, both user data are merged to one user data, both privileged codes are merged to one privileged code, and both privileged data are merged to one privileged data.

2. A high-speed address translation system as claimed in claim 1 wherein the online program module is formed of the user code section and the user data section, the user code section is formed of two user codes and the dummy section, and the user data section is formed of two user data and the dummy section.

3. A high-speed address translation system as claimed in claim 2 wherein, in the online program module, a size of the dummy section is determined so as to become a predetermined multiple of large page size.

4. A high-speed address translation system provided in a computer system including a logical address space storing logical addresses, a physical address space for storing physical addresses and a microprocessor unit connected to both address spaces, and the microprocessor unit including a memory management unit, the system comprising:

a translation lookaside buffer (TLB) provided in the memory management unit for translating the logical address to the physical address; and means for adjusting a size of sections formed of a file to a predetermined page size in an offline process in accordance with memory allocation designed in the offline process, wherein, the offline process is executed by an offline program module which is formed of at least two user programs each including user code and user data, and at least two privileged programs each including privileged code and privileged data, and wherein the offline program module is translated into the online program module, in the above translation, both user codes in the offline program module are merged to one user code in the online program module, both user data are merged to one user data, both privileged codes are merged to one privileged code, and both privileged data are merged to one privileged data.

5. A high-speed address translation system as claimed in claim 4 wherein the online program module is formed of the user code section and the user data section, the user code section is formed of two user codes and the dummy section, and the user data section is formed of two user data and the dummy section.

6. A high-speed address translation system as claimed in claim 5 wherein, in the online program module, a size of the dummy section is determined so as to become a predetermined multiple of large page size.

* * * * *